Apr. 24, 1923.
E. M. WHEELOCK
1,453,231
POWER OPERATED ROAD GRADING MACHINE
Filed July 23, 1920      5 Sheets-Sheet 1
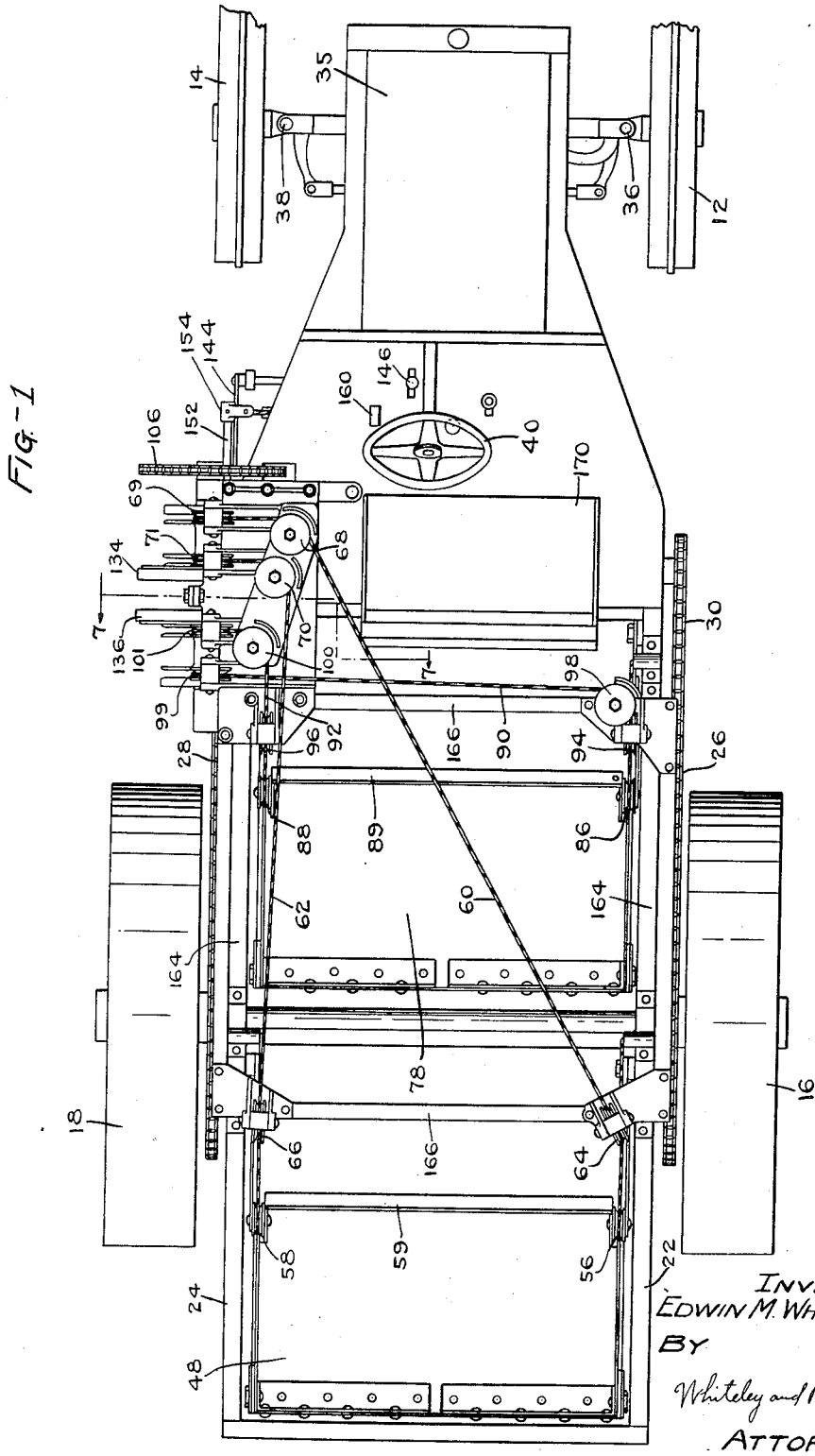
INVENTOR:
EDWIN M. WHEELOCK.
BY
Whiteley and Ruckman
ATTORNEYS.

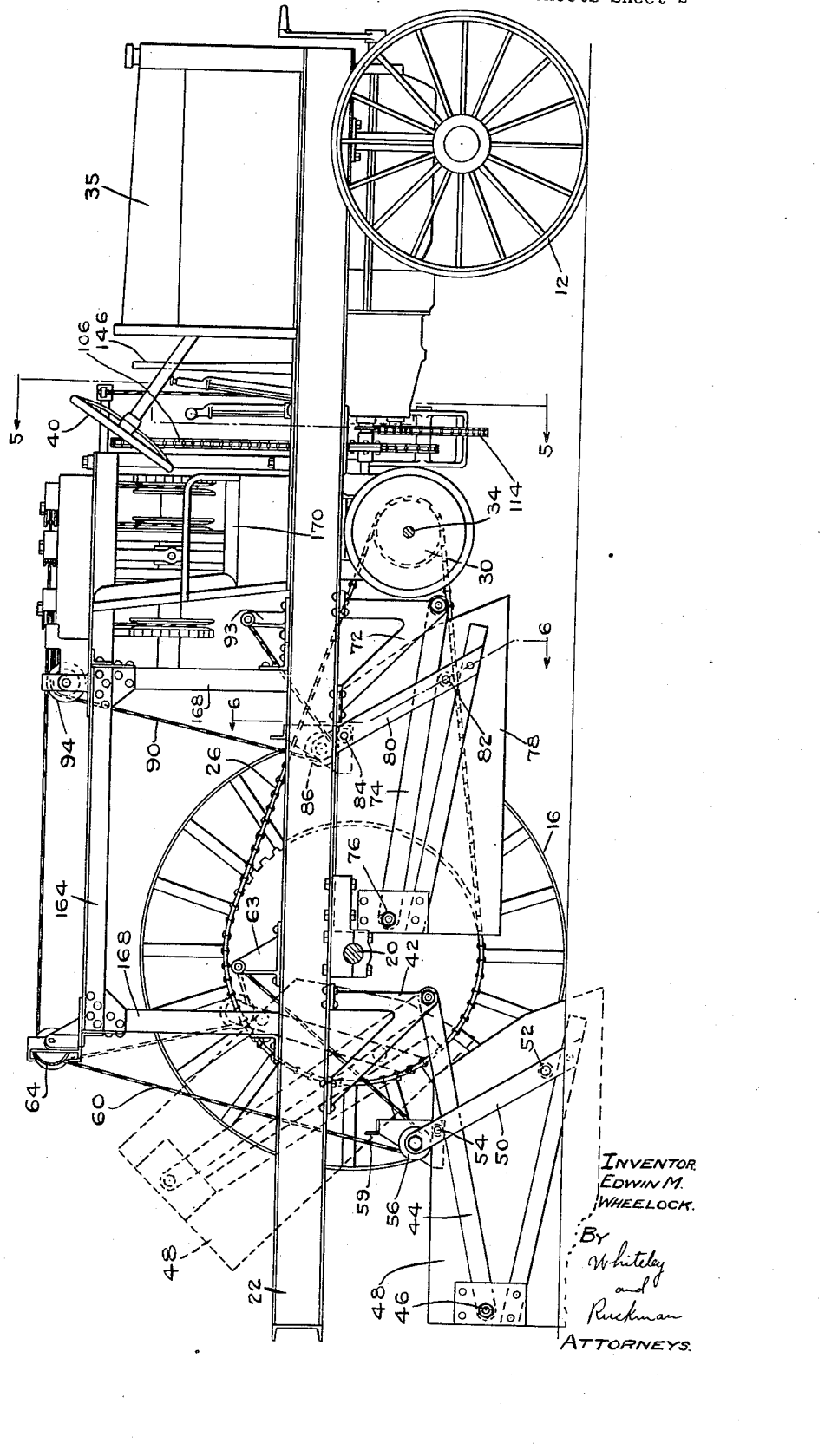

Apr. 24, 1923.
E. M. WHEELOCK
1,453,231
POWER OPERATED ROAD GRADING MACHINE
Filed July 23, 1920     5 Sheets-Sheet 3
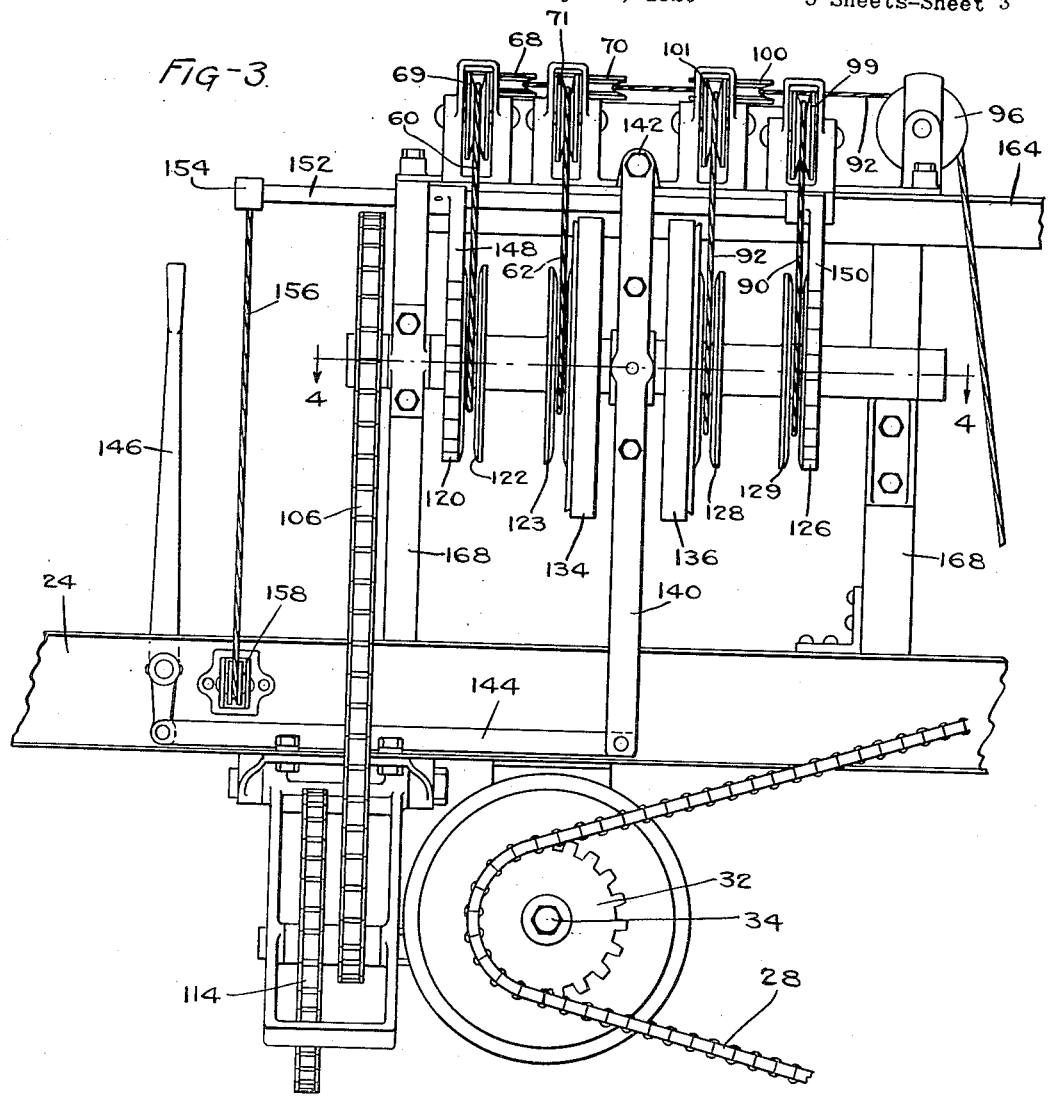
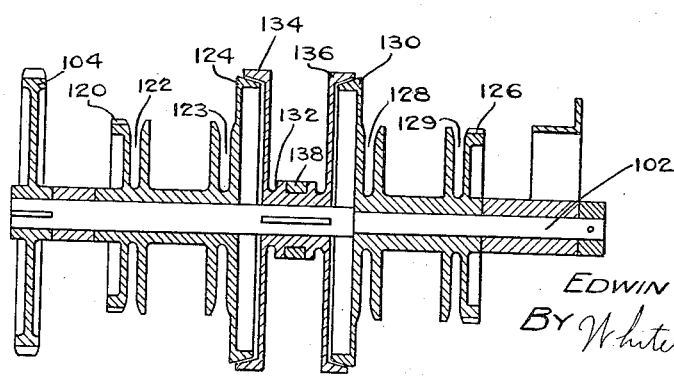
INVENTOR:
EDWIN M. WHEELOCK.
BY Whiteley and Ruckman
ATTORNEYS.

Apr. 24, 1923.

E. M. WHEELOCK 1,453,231

POWER OPERATED ROAD GRADING MACHINE

Filed July 23, 1920     5 Sheets-Sheet 4

INVENTOR:
EDWIN M. WHEELOCK.
BY Whiteley and Ruckman
ATTORNEYS.

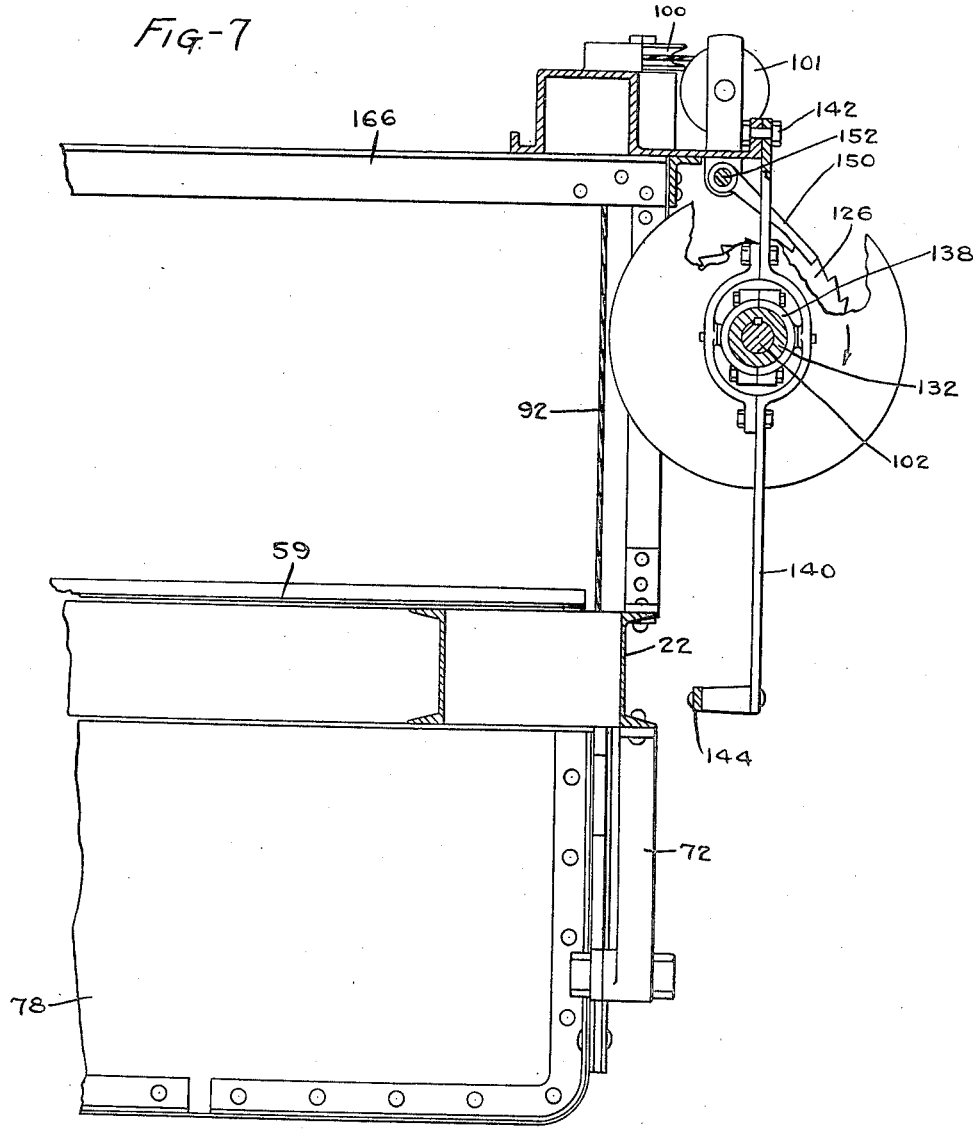

Patented Apr. 24, 1923. 1,453,231

UNITED STATES PATENT OFFICE.

EDWIN M. WHEELOCK, OF WINONA, MINNESOTA.

POWER-OPERATED ROAD-GRADING MACHINE.

Application filed July 23, 1920. Serial No. 398,398.

*To all whom it may concern:*

Be it known that I, EDWIN M. WHEELOCK, a citizen of the United States, residing at Winona, in the county of Winona and State of Minnesota, have invented certain new and useful Improvements in Power-Operated Road-Grading Machines, of which the following is a specification.

My invention relates to power-operated road-grading machines. An object is to provide a machine having one or more scoops adapted to be loaded automatically with earth and lifted into carrying position by power from a traction engine which also causes the machine to be moved to the place where the earth is to be deposited, the scoops being then dumped by power from the engine.

The full objects and advantages of my invention will appear in connection with the detailed description thereof and the novel features embodied in my inventive idea will be particularly pointed out in the claims.

In the accompanying drawings, which illustrate the application of my invention in one form,—

Figure 5:
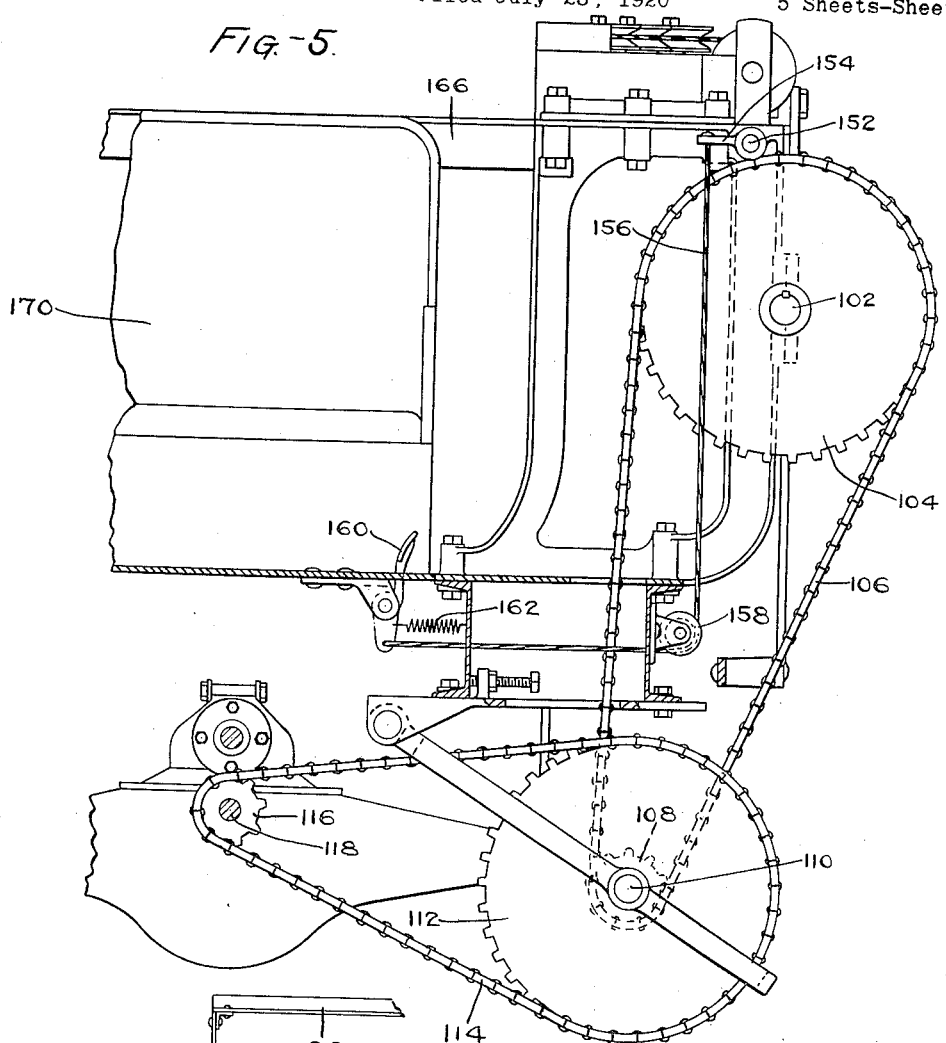
Figure 6:
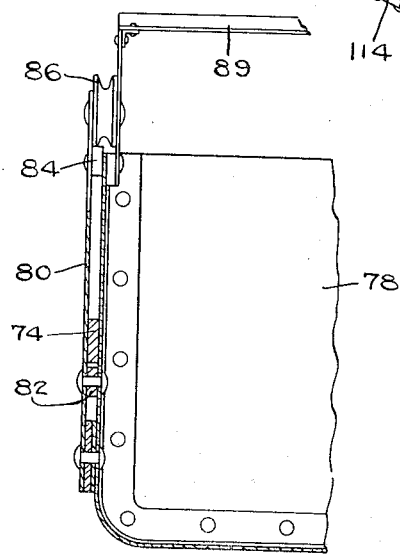

Fig. 1 is a top plan view of an apparatus embodying my invention. Fig. 2 is a side elevational view thereof. Fig. 3 is an enlarged elevational view of the winding mechanism taken from the opposite side with relation to Fig. 2. Fig. 4 is a view in section on the line 4—4 of Fig. 3. Fig. 5 is an enlarged view in section on the line 5—5 of Fig. 2. Fig. 6 is a fragmentary view of a scoop in section on the line 6—6 of Fig. 2. Fig. 7 is an enlarged view in section on the line 7—7 of Fig. 1.

In the embodiment of my invention illustrated in the drawings, the machine has front guiding wheels 12 and 14 and rear driving wheels 16 and 18. The driving wheels are mounted on a rear axle 20 carried by longitudinal side frame members 22 and 24, and these wheels are driven by sprocket chains 26 and 28 running from sprocket wheels attached to the hubs of the driving wheels and over sprocket wheels 30 and 32 secured to a shaft 34 which is driven in suitable manner from an engine mounted under a hood 35 at the front of the machine. The guiding wheels 12 and 14 are carried by steering knuckles 36 and 38 operated in the customary manner by a steering or hand wheel 40. Attached to the side frame members 22 and 24 are a pair of hangers 42, one on each side. Pivotally connected to the lower end of each hanger is an arm 44, and the rear ends of the pair of arms are pivotally attached at 46 to a scoop 48 the front and top of which are open. The arms 44 extend between the outside of the scoop and straps 50 secured at 52 and 54 to the sides of the scoop so that stops limiting the movement of the arms with relation to the scoop are constituted at 52 and 54. Rollers 56 and 58 are mounted in the upper ends of the straps 50 and also in the downturned ends of a transverse bar 59 attached to the scoop. Cables 60 and 62 are secured to brackets 63 on the frame members and these cables pass respectively under the rollers 56 and 58, then over rollers 64 and 66, and after extending forwardly pass over guide rollers 68, 69, 70 and 71 to a winding device, which will be described in detail later. Attached to the frame members 22 and 24 forwardly of the hangers 42 are a pair of hangers 72, one on each side. Pivotally connected to the lower end of each hanger 72 is an arm 74, and the rear ends of the pair of arms are pivotally attached at 76 to a scoop 78 which is similar to the scoop 48 and located in front thereof, both of these scoops being between the side frame members 22 and 24. The arms 74 extend between the outside of the scoop 78 and straps 80 secured at 82 and 84 to the sides of the scoop, so that stops limiting the movement of the arms relatively to the scoop are formed at 82 and 84. Rollers 86 and 88 are mounted in the upper ends of the straps 80 and also in the downturned ends of a transverse bar 89 secured to the scoop, as best shown in Fig. 6. Cables 90 and 92 are secured to brackets 93 on the frame members and these cables pass respectively under the rollers 86 and 88, then over rollers 94 and 96 and over guide rollers 98, 99, 100 and 101 to the same winding device previously mentioned. The shaft 102 of this winding device is best shown in Fig. 4 and to one end of this shaft is secured a sprocket wheel 104 over which passes a sprocket chain 106 which also passes over a sprocket wheel 108 secured to a shaft 110. To the shaft 110 is secured a sprocket wheel 112 over which runs a sprocket chain 114 which also runs over a sprocket wheel 116 secured to a shaft 118 driven in suitable manner from the engine. On account of the difference in size of the sprocket wheels the shaft 102 will be driven at a greatly reduced rate of speed. Rotatably mounted on the shaft 102 is a sleeve to which are secured a ratchet wheel 120, reel members 122 and 123 and a clutch member 124, and also rotatably mounted on said shaft is another sleeve to which are secured a ratchet wheel 126, reel members 128 and 129 and a clutch member 130. Splined on shaft 102 between the two sleeves just mentioned is a sleeve 132 to which are secured clutch members 134 and 136 adapted to cooperate respectively with the clutch members 124 and 130 according to the position of the sleeve 132, which has a groove containing a ring 138 carried by a lever 140 pivoted at 142, the movable end of this lever being connected by a link 144 to a shifting lever 146. Cooperating with the ratchet wheels 120 and 126 are gravity pawls 148 and 150 secured to a rotatably-mounted rod 152 having an arm 154 to which is attached one end of a cable 156 running over a roller 158, the other end of the cable being attached to a foot pedal 160 held in one direction by a spring 162 so that by depressing the pedal the pawls will be lifted from the ratchet wheels. By comparing Fig. 1 with Fig. 3, which shows the winding mechanism from the opposite side in which it appears in Fig. 2, it will be seen that the two cables 60 and 62 connected with the scoop 48 are adapted to be wound on the reels 122 and 123 and that the two cables 90 and 92 connected with the scoop 78 are adapted to be wound on the reels 129 and 128 respectively. An auxiliary frame or superstructure consisting of longitudinal bars 164, transverse bars 166 and vertical supports 168 serve to support the guide rollers and the winding device, the forward portion of the auxiliary frame being narrowed at one side to provide space for an operator's seat 170.

In operation the grading machine is driven over the ground by means of the traction engine. When the scoops are in lowered position the tendency is for their front ends to dig into the ground, since they are pivotally supported at their rear ends upon the pair of arms 44. By reference to Fig. 2, which shows the scoop 48 in its lowered position in full lines, it will be seen that the upper stops 54 are engaged by the arms 44 and this prevents the front end of the scoop from being pulled too far in a downward direction so that the scoop is maintained in the proper position for scooping up dirt. Both the scoops 48 and 78 operate in similar manner, although the forward scoop 78 may, if desired, be filled first. After being filled the scoops are lifted into carrying position, as shown in Fig. 2 in regard to the scoop 78, which is shown lifted until the arms 74 engage the lower stops 82, in which position the scoop is carried substantially level. When it is desired to dump the scoops they are lifted into the tilted position shown in dotted lines in reference to the scoop 48 in Fig. 2. The lifting is done by the winding mechanism previously described in detail. When the operator moves the lever 146 and shifts the clutch member 134 into engagement with the clutch member 124 the reel 122 winds up the cable 60 and the reel 123 winds up the cable 62, thereby lifting the scoop 48 into its level carrying position. The clutch is then disengaged and when the place for dumping is reached the same clutch is again engaged and the scoop is lifted further into dumping position, as shown in dotted lines in Fig. 2. In this latter operation it will be observed that the scoop and the arms 44 turn together around the pivotal attachment of the arms on the hangers 42. The pawl 148 on account of its engagement with the ratchet wheel 120 holds the scoop in its lifted position. When the operator moves the lever 146 in the direction to shift the clutch member 136 into engagement with the clutch member 130, then the reel 129 winds up the cable 90 and the reel 128 winds up the cable 92, thereby lifting the scoop 78 in a manner similar to the scoop 48, the scoop 78 being maintained in its lifted position by engagement of pawl 150 with ratchet wheel 126, as best shown in Fig. 7. When the scoops have been dumped the machine is driven back for another load and when the operator presses on the foot pedal 160 the pawls 148 and 150 are lifted, thereby permitting both scoops to drop to the ground, it being understood that the lever 146 is at this time in its intermediate position. If the operator desires to fill the forward scoop 78 first he immediately causes the scoop 48 to be lifted by properly manipulating the lever 146, and then when the scoop 48 is filled it is lifted by manipulating the handle 146, while the scoop 78 is dropped by depressing the pedal 160. The many advantages of this grading machine will be apparent. It gives opportunity to apply the large power of a traction engine directly to the gathering up and loading of earth followed by transporting and dumping of the same without the necessity of double handling, as is the case where dump wagons are employed.

I claim:

1. A road grading machine comprising a wheel-supported frame, a traction engine mounted on said frame, two hangers attached to said frame at opposite sides thereof, rearwardly extending arms pivoted to the lower ends of said hangers, a scoop pivotally attached at its rear to the rear ends of said arms, and means for lifting said scoop by power from said engine.

2. A road grading machine comprising a wheel-supported frame, a traction engine mounted on said frame, a pair of arms pivoted to said frame, a scoop pivotally attached at its rear to said arms, a pair of straps attached to the sides of said scoop, said arms passing between said sides and said straps, upper and lower stops for limiting the amount of pivotal movement of said scoop relatively to said arms, and means for lifting said scoop by power from said engine.

3. A road grading machine comprising a wheel-supported frame, a traction engine mounted on said frame, two scoops supported from said frame one ahead of the other, means connecting said scoops with said frame for drawing said scoops into the earth, a winding shaft mounted on said frame, two sleeves loosely mounted on said shaft, a pair of reels secured to each of said sleeves, a shaft driven by power from said engine, driving connections between said shaft and said winding shaft, a pair of cables connecting the front scoop with the pair of reels on one of said sleeves, a pair of cables connecting the rear scoop with the pair of reels on the other of said sleeves, means under control of the operator for clutching said sleeves to said winding shaft, means associated with said sleeves for retaining said cables in their wound-up condition, and means under control of the operator for releasing said cables from their wound-up condition.

4. A road grading machine comprising a wheel-supported frame, a traction engine mounted on said frame, two scoops supported from said frame one ahead of the other, means connecting said scoops with said frame for drawing said scoops into the earth, a longitudinal winding shaft mounted on said frame, two sleeves loosely mounted on said shaft, a ratchet wheel and a pair of reels and a clutch member secured to each of said sleeves, a sleeve splined on said shaft between said loose sleeves, two clutch members secured to said splined sleeve and adapted to engage one or the other of the aforesaid sleeves according to the position of said splined sleeve, a shifting lever adapted to be moved by the operator to slide said splined sleeve in either direction, a pair of cables connecting the front scoop with the pair of reels on one of said sleeves, a pair of cables connecting the rear scoop with the pair of reels on the other of said sleeves, a shaft driven by power from said engine, driving connections between said shaft and said winding shaft, pawls engageable with said ratchet wheels to retain said cables in wound-up condition, and means under control of the operator for disengaging said pawls from said ratchet wheels.

In testimony whereof I hereunto affix my signature.

EDWIN M. WHEELOCK.